(12) United States Patent
Kodera et al.

(10) Patent No.: US 11,752,969 B2
(45) Date of Patent: *Sep. 12, 2023

(54) NON-COATED AIR BAG BASE CLOTH AND AIR BAG

(71) Applicant: SEIREN CO., LTD., Fukui (JP)

(72) Inventors: Shota Kodera, Fukui (JP); Tsuyoshi Houraiya, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/651,851

(22) PCT Filed: Sep. 27, 2018

(86) PCT No.: PCT/JP2018/036071
§ 371 (c)(1),
(2) Date: Mar. 27, 2020

(87) PCT Pub. No.: WO2019/065895
PCT Pub. Date: Apr. 4, 2019

(65) Prior Publication Data
US 2020/0247348 A1   Aug. 6, 2020

(30) Foreign Application Priority Data

Sep. 29, 2017  (JP) .................. 2017-192246

(51) Int. Cl.
*B60R 21/235* (2006.01)
*D03D 1/02* (2006.01)

(52) U.S. Cl.
CPC ............ *B60R 21/235* (2013.01); *D03D 1/02* (2013.01); *B60R 2021/23509* (2013.01); *B60R 2021/23538* (2013.01); *D10B 2331/04* (2013.01)

(58) Field of Classification Search
CPC ............... B60R 21/235; B60R 21/237; B60R 2021/23509; B60R 2021/23542;
(Continued)

(56) References Cited

U.S. PATENT DOCUMENTS 6,607,995 B1 * 8/2003 Takeuchi ........... D03D 15/0083
442/216
9,878,684 B2 * 1/2018 Tanaka .................. D03D 11/00
(Continued)

FOREIGN PATENT DOCUMENTS

| CN | 101205650 A | 6/2008 |
| CN | 102959147 A | 3/2013 |

(Continued)

OTHER PUBLICATIONS https://patents.google.com/patent/CN101205650A/en?oq= CN101205650 (Year: 2006).*
(Continued)

*Primary Examiner* — Arti Singh-Pandey
(74) *Attorney, Agent, or Firm* — Birch, Stewart, Kolasch & Birch, LLP

(57) ABSTRACT

A non-coated air bag base cloth of the present invention is constituted by a fabric formed using a yarn containing polyethylene terephthalate as a main raw material, in which a single fiber strength of a yarn of the fabric is 7.30 to 8.50 cN, a single fiber fineness of a yarn of the fabric is 1.6 to 3.9 dtex, and a cover factor is 2400 to 2800.

6 Claims, 3 Drawing Sheets

| | Single fiber fineness [dtex] | Single fiber strength [cN] | Density [#/2.54 cm] | CF | Thickness [mm] | Air permeability [ml/cm²·sec] | Amount of air permeation [L/cm²·min] | Circular sewing Diameter 80 mm | Circular sewing Diameter 100 mm | Circular sewing Diameter 200 mm | Sink mark | Straight line stitching 10 cm distance | Straight line stitching Sink mark |
|---|---|---|---|---|---|---|---|---|---|---|---|---|---|
| Work. Ex. 1 | 2.58 | 7.98 | 57/57 | 2471 | 0.30 | 0.192 | 0.75 | 0 | 0 | 0 | 1 | 0 | 1 |
| Work. Ex. 2 | 2.29 | 7.98 | 71/71 | 2543 | 0.25 | 0.095 | 0.42 | 0 | 0 | 0 | 3 | 0 | 1 |
| Work. Ex. 3 | 3.26 | 7.56 | 57/57 | 2471 | 0.31 | 0.292 | 1.16 | 0 | 0 | 0 | 2 | 0 | 1 |
| Work. Ex. 4 | 3.44 | 7.98 | 72/70 | 2598 | 0.27 | 0.192 | 0.82 | 1 | 3 | 3 | 3 | 0 | 1 |
| Work. Ex. 5 | 3.18 | 7.50 | 67/67 | 2552 | 0.27 | 0.275 | 1.07 | 4 | 5 | 7 | 1 | 0 | 1 |
| Comp. Ex. 1 | 4.01 | 7.27 | 70/66 | 2665 | 0.30 | 0.217 | 0.82 | 18 | 25 | 35 | 4 | 0 | 1 |

(58) Field of Classification Search
CPC ............ B60R 2021/23576; D03D 1/02; D10B 2331/04; D10B 2505/124
See application file for complete search history.

(56) References Cited

U.S. PATENT DOCUMENTS

| | | | | |
|---|---|---|---|---|
| 2002/0155774 | A1* | 10/2002 | Kitamura | ............... D03D 15/00 442/208 |
| 2008/0188151 | A1* | 8/2008 | Yokoi | ............... D03D 15/0088 442/76 |
| 2012/0225229 | A1* | 9/2012 | Ise | ............... B60R 21/235 428/35.5 |
| 2013/0089725 | A1 | 4/2013 | Jung et al. | |
| 2013/0224468 | A1 | 8/2013 | Kim et al. | |
| 2015/0329998 | A1 | 11/2015 | Ise | |
| 2015/0336530 | A1 | 11/2015 | Tanaka et al. | |
| 2018/0099636 | A1 | 4/2018 | Ise | |
| 2018/0281737 | A1 | 10/2018 | Houraiya | |
| 2019/0218692 | A1* | 7/2019 | Kodera | ............... D03D 1/02 |
| 2020/0047704 | A1* | 2/2020 | Kodera | ............... B60R 21/237 |
| 2020/0247348 | A1* | 8/2020 | Kodera | ............... D03D 1/02 |
| 2021/0016739 | A1* | 1/2021 | Kodera | ............... D01F 6/62 |

FOREIGN PATENT DOCUMENTS

| | | |
|---|---|---|
| CN | 104955994 A | 9/2015 |
| CN | 108350622 A | 7/2018 |
| JP | 6-184856 A | 7/1994 |
| JP | 7-54238 A | 2/1995 |
| JP | 8-134721 A | 5/1996 |
| JP | 9-309396 A | 12/1997 |
| JP | 2013-528719 A | 7/2013 |
| JP | 2013-540906 A | 11/2013 |
| JP | 2015-17356 A | 1/2015 |
| WO | WO 2017/057300 A1 | 4/2017 |

OTHER PUBLICATIONS

International Search Report, issued in PCT/JP2018/036071, PCT/ISA/210, dated Dec. 4, 2018.
Written Opinion of the International Searching Authority, issued in PCT/JP2018/036071, PCT/ISA/237, dated Dec. 4, 2018.
Chinese Office Action for Chinese Application No. 201880062977.2, dated Nov. 9, 2021, with English translation.
Extended European Search Report for European Application No. 18863213.7, dated Jun. 4, 2021.
Chinese Office Action and Search Report for Chinese Application No. 201880062977.2, dated Mar. 1, 2021, with an English translation.
Chinese Office Action and Search Report for Chinese Application No. 201880062977.2, dated Apr. 2, 2022, with an English translation.
Xu, "Quality Control of Cotton Spinning," China Textile Press, Feb. 28, 2002, pp. 156-161, 9 pages total.

* cited by examiner

FIG. 2

| | Single fiber fineness [dtex] | Single fiber strength [cN] | Density [#/2.54 cm] | CF | Thickness [mm] | Air permeability [mL/cm²·sec] | Amount of air permeation [L/cm²·min] | Circular sewing Diameter 80 mm | Circular sewing Diameter 130 mm | Circular sewing Diameter 200 mm | Circular sewing Sink mark | Straight line stitching 10 cm distance | Straight line stitching Sink mark |
|---|---|---|---|---|---|---|---|---|---|---|---|---|---|
| Work. Ex. 1 | 2.58 | 7.90 | 57/57 | 2471 | 0.30 | 0.192 | 0.75 | 0 | 0 | 0 | 1 | 0 | 1 |
| Work. Ex. 2 | 2.29 | 7.90 | 71/71 | 2543 | 0.25 | 0.095 | 0.42 | 0 | 0 | 0 | 3 | 0 | 1 |
| Work. Ex. 3 | 3.26 | 7.56 | 57/57 | 2471 | 0.31 | 0.292 | 1.16 | 0 | 0 | 0 | 2 | 0 | 1 |
| Work. Ex. 4 | 3.44 | 7.90 | 72/70 | 2598 | 0.27 | 0.192 | 0.82 | 1 | 3 | 3 | 3 | 0 | 1 |
| Work. Ex. 5 | 3.18 | 7.50 | 67/67 | 2552 | 0.27 | 0.275 | 1.07 | 4 | 5 | 7 | 1 | 0 | 1 |
| Comp. Ex. 1 | 4.01 | 7.27 | 70/66 | 2669 | 0.30 | 0.217 | 0.82 | 18 | 25 | 35 | 4 | 0 | 1 |

NON-COATED AIR BAG BASE CLOTH AND AIR BAG

TECHNICAL FIELD

The present invention relates to a base cloth used in an air bag that is widely used as an occupant protection device at the time of vehicle collision, and particularly to a non-coated air bag base cloth and an air bag formed using the same.

BACKGROUND ART

Air bag devices are commonly provided in a vehicle as a safety device for occupant protection that protects an occupant from impact upon vehicle collision. Conventionally, in order to prevent gas released from an inflator from leaking from the bag, fabric coated with a resin material was mainly used, but fabric needs to be light in weight due to demands for improvements in fuel consumption and the like and needs to be compactly housed due to trends in steering wheel design and the like, and thus non-coated cloth has been widely adopted.

Also, air bags made of nylon 66 (PA66) were mainstream, but air bags made of polyethylene terephthalate (PET) are beginning to be adopted for the purpose of reducing cost (e.g., Patent Literature 1).

CITATION LIST

Patent Literature

Patent Literature 1: JP H9-309396A

SUMMARY OF INVENTION

Technical Problem

Incidentally, an air bag is formed by sewing a plurality of air bag base cloths together. However, the inventor of the present invention found that, if conventional air bag base cloths made of polyethylene terephthalate are sewn together, sink marks appear and yarn breakage occurs. If sink marks or the like appear in this manner, there is also a possibility that the quality of the external appearance of an air bag will decrease, resulting in a decrease in performance, such as air leakage. The present invention was made to resolve this issue, and an object thereof is to provide a non-coated air bag base cloth capable of preventing sink marks, yarn breakage, and the like at the time of sewing, and an air bag provided with the same.

Solution to Problem

A non-coated air bag base cloth of the present invention is constituted by a fabric formed using a yarn containing polyethylene terephthalate as a main raw material, in which a single fiber strength of a yarn of the fabric is 7.30 to 8.50 cN, a single fiber fineness of a yarn of the fabric is 1.6 to 3.9 dtex, and a cover factor is 2400 to 2800.

In the above-described non-coated air bag base cloth, the single fiber strength may be 7.55 cN or more.

In the above-described non-coated air bag base cloths, the single fiber fineness may be 3.3 dtex or less.

An air bag according to the present invention is formed by any of the above-described non-coated air bag base cloths.

Advantageous Effects of Invention

According to the present invention, it is possible to prevent sink marks, yarn breakage, and the like at the time of sewing.

BRIEF DESCRIPTION OF DRAWINGS

FIG. 2 is a table showing the physical property values and the results of the evaluation tests of working examples and a comparative example.

DESCRIPTION OF EMBODIMENTS

Figure 1:
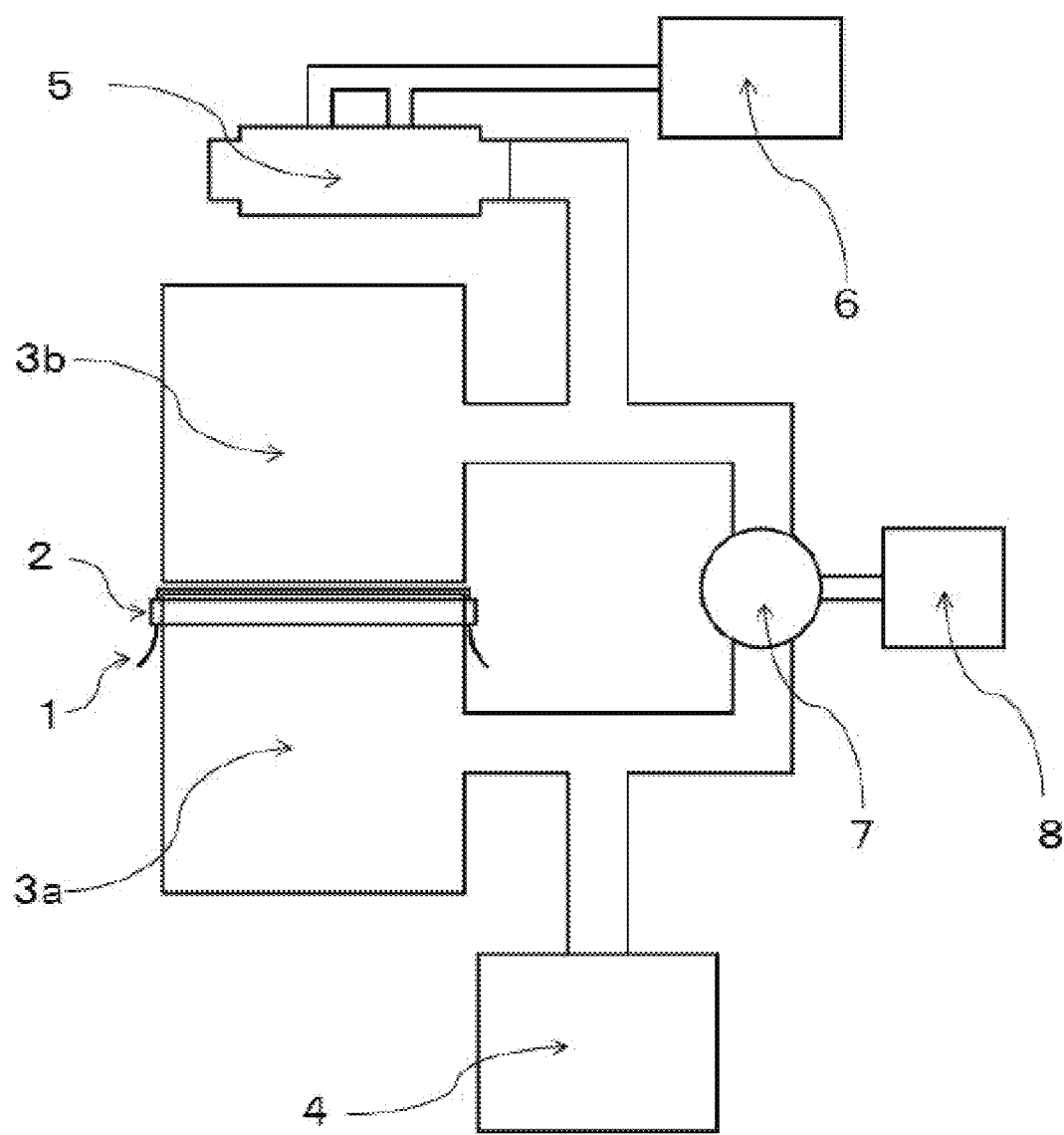
FIG. 1 is a schematic diagram of a greige air permeability measurement device.

A non-coated air bag base cloth of the present invention is mainly constituted by a fabric woven using a yarn containing polyethylene terephthalate as a main raw material. A single fiber strength of a yarn that forms the fabric is 7.30 to 8.50 cN, and a single fiber fineness of the yarn is 1.6 to 3.9 dtex. Also, the fabric has a cover factor of 2400 to 2800.

Hereinafter, this non-coated air bag base cloth will be described in more detail. First, it is important that the cover factor of the fabric is 2400 or more, preferably 2430 or more, more preferably 2460 or more, and particularly preferably 2500 or more. By setting the cover factor to 2400 or more, gaps between weaving yarns are small and excellently low air permeability can be obtained. Also, it is preferable that the cover factor is 2800 or less because the flexibility of the fabric is unlikely to be impaired and good foldability can be obtained. From this point of view, the cover factor is preferably 2600 or less. Note that a cover factor (also referred to as CF) is a value calculated using the equation below in the present invention.

$$\text{Cover factor (CF)} = \text{warp density of fabric} \times \sqrt{\text{total fineness of warp}} + \text{weft density of fabric} \times \sqrt{\text{total fineness of weft}}$$

With regard to the air permeability of the base cloth of the present invention, air permeability that is measured using a Frazier method is preferably 0.5 ml/cm$^2$·sec or less, and more preferably 0.3 ml/cm$^2$·sec or less. By setting the air permeability to be the above-described value, if an air bag base cloth is formed using the fabric of the present invention, gas leakage from the surface of this base cloth is reduced, the size of an inflator can be reduced, and quick deployment is possible.

Yarns that constitute the base cloth of the present invention preferably have a total fineness of 280 dtex or more. If the total fineness of yarns is 280 dtex or more, the strength of the fabric becomes more superior as an air bag. Also, the total fineness is preferably 560 dtex or less and more preferably 470 dtex or less because a lightweight fabric can be easily obtained.

Yarns that constitute the fabric may be the same or different from each other. The fabric may be constituted by yarns having different single fiber finenesses (=total fineness/the number of filaments), for example. Specifically, it is important to use a yarn having a single fiber fineness of 1.6 to 3.9 dtex, and a yarn having a single fiber fineness of 1.6 to 3.3 dtex is more preferable, for example. By setting the single fiber fineness to 3.9 dtex or less, a yarn is flexible and easy to loosen, increasing the degree of freedom of movement in the fabric. As a result, the flexibility of the fabric increases. Also, as described above, even if a base cloth has a large cover factor, yarns of the fabric are likely to be pulled by a sewing thread during sewing, thus a load applied during sewing can be easily dispersed. Thus, it is possible to prevent yarn breakage. In particular, if the single fiber fineness is 3.3 dtex or less, a yarn breakage prevention effect is improved. In contrast, if the base cloth has a large cover factor and the single fiber fineness thereof is larger than 3.9 dtex, there is a risk that yarn breakage will occur because a load cannot be absorbed due to yarns being unlikely to be pulled. However, even if the single fiber fineness is large, if the cover factor is small, the degree of freedom of a yarn increases, and thus it is possible to inhibit yarn breakage and sink marks. From this point of view, if the single fiber fineness is 3.0 dtex or more, for example, the cover factor is preferably 2500 or less. On the other hand, if the single fiber fineness is less than 3.0 dtex, for example, the cover factor is preferably 2500 or more.

On the other hand, if the single fiber fineness is smaller than 1.6 dtex, strength required for an air bag cannot be obtained, and a yarn is so thin that yarn breakage is likely to occur during weaving. Also, there is an issue that fuzz is likely to appear. Thus, the single fiber fineness is more preferably 2.0 dtex or more, and particularly preferably 2.5 dtex or more.

Also, it is sufficient that the cross-sectional shape of a single fiber is selected from a circle, an ellipse, a flattened shape, a polygon, a hollow shape, other variants, and the like. It is sufficient to use mixed fibers, doubling yarns, combined use yarns, mixed use yarns thereof (the warp and the weft have different cross-sectional shapes), or the like as needed, and to appropriately select the cross-sectional shape to the extent that the spinning process, the fabric production process, the fabric physical properties, and the like are not hindered.

One or more of various additives that are usually used to improve spinnability, processability, durability, and the like of yarns may be used for these yarns (fibers), examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The single fiber strength is preferably 7.30 to 8.50 cN, and more preferably 7.55 to 8.50 cN. As described above, although yarns are likely to be pulled through sewing and sink marks are likely to appear if the single fiber fineness is low at 3.9 dtex or less, by setting the single fiber strength to 7.30 cN or more, it is possible to inhibit the appearance of sink marks, and to inhibit yarn breakage. In particular, if the single fiber strength is 7.55 cN or more, even if the single fiber fineness is low, it is possible to further inhibit the appearance of sink marks, and to produce a fabric with a high density. Also, if the single fiber strength is smaller than 7.30 cN, fuzz is likely to appear during weaving because the strength of a yarn is low. On the other hand, if the single fiber strength is larger than 8.50 cN, there is a risk that fuzz will appear at the time of manufacturing a raw yarn and the quality of the yarn will decrease.

Also, in terms of the balance between the single fiber fineness and the single fiber strength, the single fiber strength is preferably 7.70 cN or more when the single fiber fineness is 2.5 dtex to 3.0 dtex inclusive, and the single fiber strength is preferably 7.60 cN or less when the single fiber fineness is larger than 3.0 dtex and 3.5 dtex or less, for example.

The structure of the fabric may be any of a plain weave, a basket weave, a grid weave (ripstop weave), a twill weave, a cord weave, a leno weave, a mock leno weave, and a composite structure thereof. Beside a two-axis design with warp and weft, a multi-axis design including axes that are inclined at 60 degrees may be adopted as needed, and in this case, the arrangement of yarns need only be in conformity with the same arrangement of the warp or the weft. Among these, plain weave is preferable in terms of ensuring the tightness of the structure, the physical properties, and the evenness of the performance.

The weave densities of the warp and the weft of the fabric are each preferably 48 to 75/2.54 cm, and more preferably 55 to 68/2.54 cm, in terms of performance such as the weavability and air permeability. However, a density difference between the warp and the weft is preferably small. That is, it is preferable that the warp and the weft have the same weave density. If the warp and the weft have a large density difference, there is a risk that the balance of a fabric will deteriorate, and sink marks will be likely to appear.

An air bag of the present invention can be obtained by joining at least one piece of main body base cloth obtained by cutting the base cloth of the present invention into a desired shape. All pieces of main body base cloth that constitute the air bag are preferably constituted by the base cloth, or a portion thereof may be constituted by the base cloth. Also, it is sufficient to select the specifications, shape, and volume of the air bag in accordance with the site at which the air bag is to be disposed, the application, housing space, the performance of absorbing occupant impact, the output of the inflator, and the like. Furthermore, a reinforcement cloth may be added according to required performance, and a non-coated fabric that is equivalent to the main body base cloth, a non-coated fabric that is different from the main body base cloth, or a fabric that is coated with a resin and is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly by sewing, it is possible to use partial adhesion, welding, or the like in combination, or use a joining method employing weaving or knitting. That is, there is no particular limitation on the joining method as long as the air bag has satisfactory durability, impact resistance at the time of deployment, the performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewn portion is not long, sewing may be performed using a single-needle sewing machine a plurality of times. If a plurality of base cloths are used as an air bag body, a plurality of base cloths may be sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel yarns, and any of a spun yarn, a filament twisted yarn, or a filament resin processed yarn may be used.

Furthermore, in order to prevent gas leakage from stitches of outer circumferential sewn portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can be applied in multiple applications such as ships, railroad trains, electric railcars, aircraft, and amusement park equipment.

WORKING EXAMPLES

Hereinafter, the present invention will be more specifically described based on working examples, but the present invention is not limited to these working examples. FIG. 2 shows physical property values and results of evaluation of non-coated air bag base cloths according to Working Examples 1 to 5 and a comparative example. Also, methods for measuring the physical property values will be described below.

Total Fineness of Yarns

Measurement was performed in conformity with method B in JIS L 1013 8.3.1.

Number of Yarn Filaments

Measurement was performed in conformity with JIS L 1013 8.4.

Single Fiber Fineness

The single fiber fineness was obtained by dividing the total fineness of yarns by the number of yarn filaments.

Single Fiber Strength

Measurement was performed in conformity with JIS L 1013 8.5 (tensile strength).

Weave Density of Fabric

Measurement was performed in conformity with method A in JIS L 1096 8.6.1. The density is indicated by the density of the warp/the density of the weft in the table shown in FIG. 2, which will be described later.

Thickness of Fabric

Measurement was performed in conformity with method A in JIS L 1096 8.4.

Air Permeability of Fabric 1

Measurement was performed in conformity with method A (Frazier method) in JIS L 1096 8.26.1.

Air Permeability of Fabric 2 (Amount of Air Permeation)

The air flow rate through the obtained base cloth under a differential pressure of 20 kPa was measured using a greige air flow rate measurement device (manufactured by KYO-TOSEIKO CO., LTD., a flowmeter 6: DF2810P manufactured by COSMO INSTRUMENTS CO., LTD., a laminar flow tube 5: LF2-100L manufactured by COSMO INSTRUMENTS CO., LTD., and a pressure gauge 8: DP-330BA manufactured by COSMO INSTRUMENTS CO., LTD.) shown in FIG. 1. As shown in FIG. 1, Sample 1 was obtained by cutting the obtained base cloth into a 20 cm×20 cm piece, and was fixed, using a ring-shaped fastener 2, to a tubular clamp 3a having an inner diameter of 50 mm that was connected to a pressure device 4, and was held by a tubular clamp 3b having an inner diameter of 50 mm that was connected to the laminar flow tube 5. Then, a pressure was applied to Sample 1 from the tubular clamp 3a side, and a pressure adjustment valve 7 was operated such that the pressure gauge 8 displayed 20 kPa. The flow rate of air passing through the sample in the above-described state was detected using the flowmeter 6 that was connected to the laminar flow tube 5, and air permeability was evaluated using the air flow rate under a differential pressure of 20 kPa.

Evaluation Relating to Sewing

Two pieces of base cloth were stacked on each other, and two different types of sewing, that is, circular sewing and straight-line stitching, were performed through lock stitching using a sewing machine with a nylon 66 sewing thread. In circular sewing, three types of circular sewing were performed with diameters of 80 mm, 180 mm, and 200 mm. At this time, sewing was performed using a sewing thread with the needle thread and the bobbin thread of the sewing machine being 1400 dtex with a stitch count of 3.5 stitches/10 cm. Straight line stitching was performed at a distance of 10 cm under the same conditions as those of circular sewing. Then, the appearance of sink marks and the number of instances of yarn breakage were visually checked after sewing was performed. The appearance of sink marks was evaluated through the results of visual observation based on the following criteria.

1: There were no sink marks, or there were one or two slight sink marks (e.g., sink marks that can be seen only by the reflection of light when the angle was changed).

2: There were three or more slight sink marks described above, but there were no highly visible sink marks.

3: Not only the above-described slight sink marks appeared, but also there was no more than one highly visible sink mark (that was immediately recognized from the external appearance thereof and would be treated as a defect).

4: Not only the above-described slight sink marks appeared, but also there were two or more highly visible sink marks.

1 to 3 out of these criteria 1 to 4 were allowable.

The results are shown in FIG. 2. Also, considerations relating to the working examples and the comparative example will be described below.

(1) Working Example 1

Although sink marks will be likely to appear because the single fiber fineness thereof was low, the appearance of sink marks was inhibited because the single fiber strength thereof was high. Also, Working Example 1 was likely to elongate and yarn breakage did not occur because the single fiber fineness thereof was low. High single fiber strength also contributed to the prevention of yarn breakage.

(2) Working Example 2

Even though the single fiber strength thereof was high, the appearance of sink marks was not sufficiently inhibited because the single fiber fineness thereof was low. However, when the appeared sink marks were observed, the number of highly visible sink marks was one or less. Also, yarn breakage was prevented because the single fiber fineness thereof was low and the single fiber strength thereof was high.

(3) Working Example 3

Yarn breakage did not occur because the single fiber strength thereof was not low, even though the single fiber fineness thereof was high. Although sink marks appeared because yarns had some degree of freedom because the density was not high, there were no highly visible sink marks.

(4) Working Example 4

A small number of instances of yarn breakage occurred because the single fiber fineness thereof was high. Also, despite the single fiber fineness being high, sink marks appeared because the single fiber strength was also high, but there were no highly visible sink marks. However, it is conceivable that a difference in the density between the warp and the weft resulted in the appearance of sink marks.

(5) Working Example 5

Although yarn breakage occurred because the single fiber strength was slightly low and the single fiber fineness was slightly high, yarn breakage was not highly visible. Also, although the single fiber fineness was not high, the appearance of sink marks was sufficiently inhibited due to the balance between the single fiber fineness and the single fiber strength.

(6) Comparative Example

Figure 3:
FIG. 3 is an enlarged photograph showing a broken yarn of the comparative example.
Figure 4:
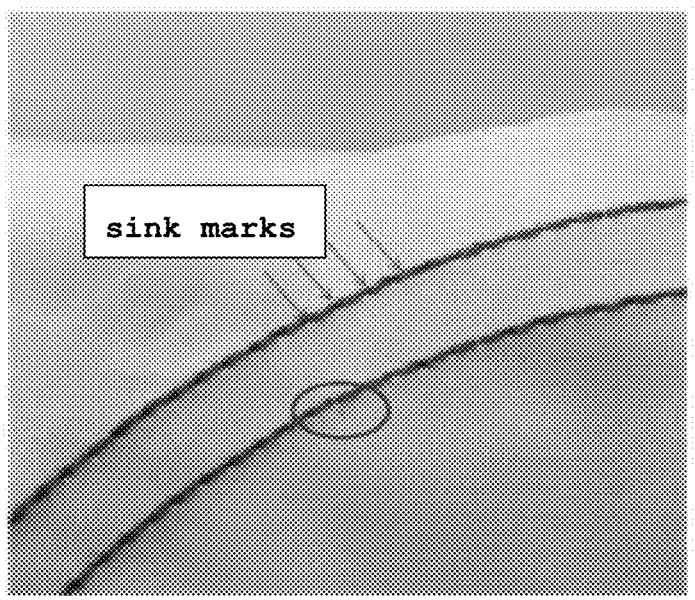
FIG. 4 is a photograph showing sink marks and a broken yarn of the comparative example.

Multiple yarns broke because the single fiber fineness thereof was excessively high and the single fiber strength thereof was low. An example of a broken yarn is shown in FIG. 3. Also, highly visible sink marks appeared because the single fiber strength was excessively low. Also, it is conceivable that a difference in the density between the warp and the weft resulted in the appearance of sink marks. An example of the state of sink marks is shown in FIG. 4. In particular, sink marks were excessively large and yarn breakage also occurred in a portion indicated by a circle in FIG. 4.

LIST OF REFERENCE NUMERALS

1 Sample for measuring air permeability
2 Ring-shaped fastener
3$a$, 3$b$ Tubular clamp
4 Pressure device
5 Laminar flow tube
6 Flowmeter
7 Pressure adjustment valve
8 Pressure gauge

The invention claimed is:
1. A non-coated air bag base cloth,
the base cloth being constituted by a fabric formed using a yarn containing polyethylene terephthalate as a main raw material,
wherein a single fiber strength of a yarn of the fabric is 7.30 to 8.50 CN/dtex,
a single fiber fineness of a yarn of the fabric is 1.6 to 3.9 dtex, and
a cover factor is 2400 to 2800.
2. The non-coated air bag base cloth according to claim 1, wherein the single fiber strength is 7.55 cN/dtex to 8.50 cN/dtex.
3. The non-coated air bag base cloth according to claim 1, wherein the single fiber fineness is 1.6 dtex to 3.3 dtex.
4. The non-coated air bag base cloth according to claim 1, wherein the single fiber fineness is 2.5 dtex to 3.0 dtex inclusive, and the single fiber strength is 7.70 cN/dtex to 8.50 cN/dtex.
5. The non-coated air bag base cloth according to claim 1, wherein the single fiber fineness is 1.6 dtex to 3.0 dtex, and the cover factor is 2500 to 2800.
6. An air bag comprising:
at least two pieces of the non-coated air bag base cloth according to claim 1; and
a thread for sewing together edge portions of the two pieces of non-coated air bag base cloth.

\* \* \* \* \*